(12) United States Patent
Smith

(10) Patent No.: US 11,805,062 B1
(45) Date of Patent: Oct. 31, 2023

(54) SYSTEMS AND METHODS FOR TRAFFIC CLASSIFICATION

(71) Applicant: T-Mobile USA, Inc., Bellevue, WA (US)

(72) Inventor: Jeffery A. Smith, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 113 days.

(21) Appl. No.: 17/342,174

(22) Filed: Jun. 8, 2021

(51) Int. Cl.
| | |
|---|---|
| *H04L 12/26* | (2006.01) |
| *H04L 47/2441* | (2022.01) |
| *H04L 9/40* | (2022.01) |
| *H04L 47/20* | (2022.01) |
| *H04L 47/2483* | (2022.01) |

(52) U.S. Cl.
CPC .......... *H04L 47/2441* (2013.01); *H04L 47/20* (2013.01); *H04L 47/2483* (2013.01); *H04L 63/0428* (2013.01)

(58) Field of Classification Search
None
See application file for complete search history.

(56) References Cited

U.S. PATENT DOCUMENTS

| | | | | |
|---|---|---|---|---|
| 9,584,533 B2* | 2/2017 | Watson | ................. | H04L 43/028 |
| 10,313,919 B2* | 6/2019 | Kang | .................... | H04W 76/10 |
| 10,999,204 B2* | 5/2021 | Tsilimantos | .......... | H04L 43/106 |
| 11,233,715 B1* | 1/2022 | Kumar | .................... | H04L 43/18 |
| 11,418,420 B2* | 8/2022 | Sivaraman | ............ | H04L 43/028 |
| 11,502,948 B2* | 11/2022 | Pismenny | ............... | H04L 45/42 |
| 11,533,299 B2* | 12/2022 | Liu | ..................... | H04L 63/0227 |
| 2020/0274815 A1* | 8/2020 | Sreevalsan | ............ | G06N 20/00 |
| 2020/0366717 A1* | 11/2020 | Chaubey | ................ | G06N 20/00 |

* cited by examiner

*Primary Examiner* — Sithu Ko
(74) *Attorney, Agent, or Firm* — Lee & Hayes, P.C.

(57) ABSTRACT

Systems and methods for classifying a traffic flow on a network to determine a policy are described herein. The systems and methods enable a network to use aspects of an encrypted traffic flow and compare those aspects against a training set of data to classify the traffic flow. The classification helps the network determine and enforce policies associated with traffic flows from various services, even if the traffic flows are encrypted (obfuscated).

17 Claims, 4 Drawing Sheets

SYSTEMS AND METHODS FOR TRAFFIC CLASSIFICATION

BACKGROUND

Traffic over wireless, wired, and cellular networks has increasingly shifted to encrypted protocols. While the increased use of encrypted protocols can help increase the security and safety of traffic over these networks, the use of encrypted protocols has created several issues for those networks. For example, various services that are provided over these networks may have policies that regulate the use of the networks. An example of this may be a video streaming service or a social media network that is provided with a certain amount of bandwidth, quality of service, and the like by the network. However, if those services and others increasingly use encrypted traffic, it may be difficult to classify traffic associated with those services in order to ensure a service level as well as enforcing a policy associated with the service.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Examples of the present disclosure comprise systems and methods for network traffic classification. In some examples, the classification of traffic can provide information to enforce various policies established by a network, and in some examples, provide for a higher level of user engagement or user experience. In conventional systems, encrypted traffic may have been classified using information available to the network, such as an analysis of the 5-tuple flow patterns, domain/server name identification ("SNI"), and/or shallow packet inspection. While these methods may still be used in some contexts, conventional methods of classifying traffic may be hindered based on new encryption techniques as well as newer network traffic technology. For example, some technologies encrypt the SNI, further obfuscating the traffic type. Additionally, malware may utilize encryption technologies to hide the traffic associated with the malware, often going undetected. In some examples, network traffic is purposefully encrypted to get around limitations associated with agreed upon policies.

To overcome some limitations found in conventional systems, the presently disclosed subject matter uses various traffic flow patterns to create categories of traffic, such as video traffic. By increasing the amount of data associated with the traffic pattern, the traffic may be categorized and associated with a particular service. Various examples of the presently disclosed subject matter store traffic patterns associated with particular flows and/or services and analyze incoming traffic against those patterns. Some of the traffic patterns include, but are not limited to, the active time of the upload, the active bytes of the upload, the number of active sessions, and the number of uplink packets greater than a specific size after a Transport Layer Security ("TLS") or Secure Socket Layer ("SSL") handshake.

By classifying traffic, a network may allocate the required or desired resources for that traffic. For example, a large social media web site may be allocated a certain amount of bandwidth at a minimum video resolution as part of an agreed upon policy between the social media website and the network. However, if the social media website desires an increased service level beyond that which the policy allocates, the social media website may cause its video traffic to be encrypted. Thus, the network may not know the video traffic is traffic from the social media website and may erroneously provide a level of service above the agreed upon policy. This can cause undesired taxing of network resources, while giving the social media website more resources than agreed upon.

Figure 1:
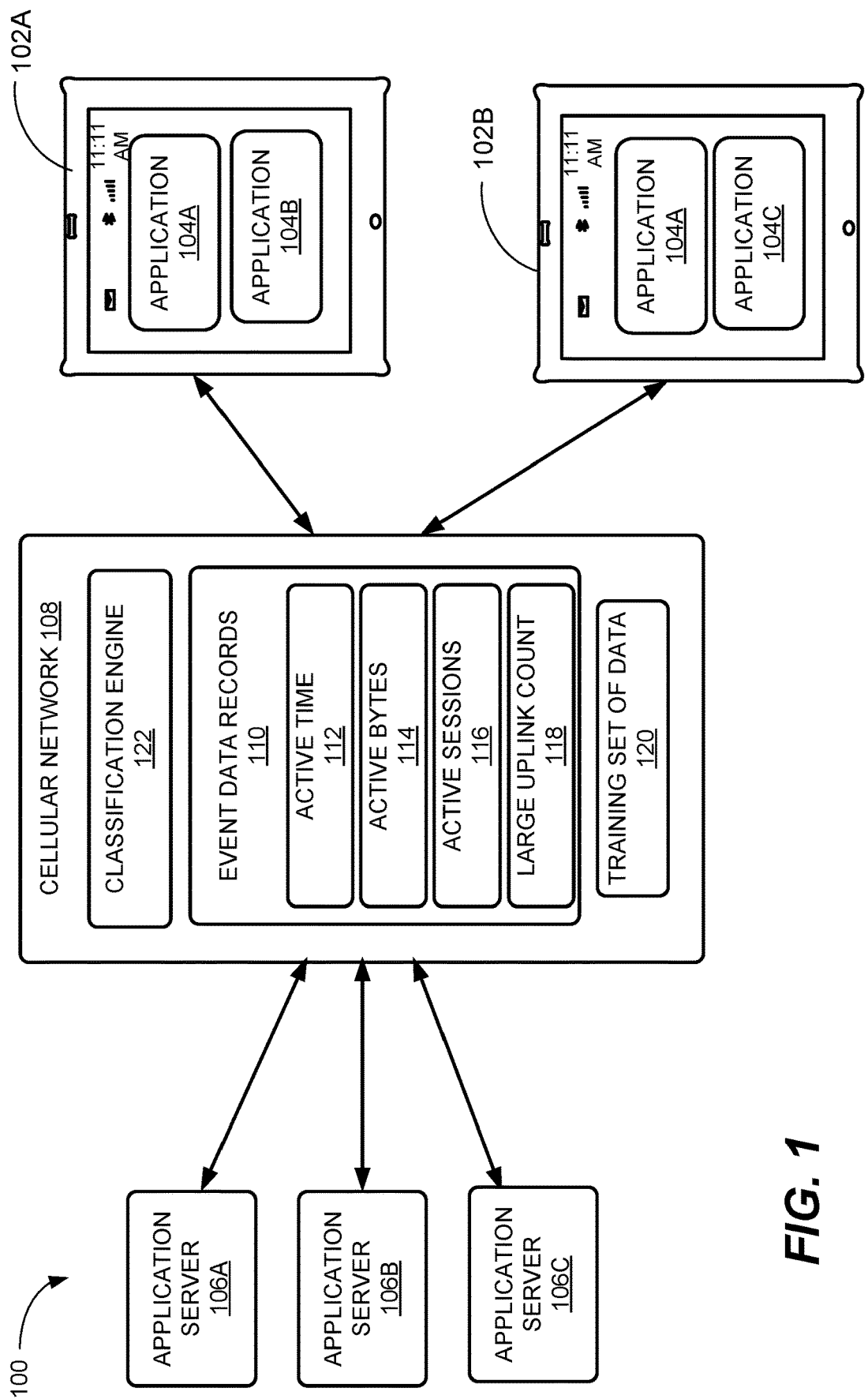
FIG. 1 depicts a system used to detect application behavior using network traffic, in accordance with some examples of the present disclosure.

As shown in FIG. 1, examples of the present disclosure can comprise a system 100 used to detect application behavior using network traffic. Illustrated in FIG. 1 are user devices 102A-102B (hereinafter referred to generically as "user devices 102," and individually as "user device 102A," and "user device 102B"). The user devices 102 have installed thereon application 104A, the user device 102A has installed thereon application 104B, and the user device B has installed thereon application 104C. Applications 104A, 104B, and 104C are nonspecific applications that, when executed, cause the reception and transmission of data to and from the user device 102 upon which the application is installed and executing. The data may be either encrypted or unencrypted data.

Also illustrated in FIG. 1 are application servers 106A-106C (hereinafter referred to generically as "application servers 106," and individually as "application server 106A," "application server 106B," and "application server 106C"). The application servers 106 are servers that provide data and receive data when the user devices 102 execute one or applications 104 on the user devices 102. For example, the application server 106A is a server that serves various functions provided by the application 104A. The application server 106B is a server that serves various functions provided by the application 104B. The application server 106C is a server that serves various functions provided by the application 104B. The movement of data to and from the application servers 106 may be termed "traffic flow."

The application servers 106 may be associated with various services or websites accessed by the user devices 102 through the use of a cellular network 108. The cellular network 108 may be various types of networks that provide communication access between one or more of the user devices 102 and one or more of the application servers 106. It should be noted that the presently disclosed subject matter is not limited to the use of cellular networks. The systems and methods discussed herein are discussed generally with respect to user devices 102 such as cellular UEs, tablets, computers, and the like, and in terms of components (e.g., network entities) associated with Wi-Fi networks, Bluetooth networks, wired networks, fourth-generation (4G) and fifth-generation (5G) cellular networks, and other types of networks. The systems and methods can be used with other types of equipment and on other types of networks, however, where users may wish to have increased flexibility in sending and receiving calls, video calls, and messages. Thus, the systems and methods described herein are described in terms of the 4G and 5G networks merely because these networks represent the state of the current art. One of skill in the art will recognize, however, the systems and methods could also be used on other networks that provide video calling such as, for example, Internet of Things (IoT), machine-to-machine (M2M), sixth-generation (6G), and other current and future networks.

Returning to FIG. 1, when one or more of the applications 104 are executed by the user devices 102, data is transmitted to the one or more application servers 106 through the cellular network 108. The transmission of data from and to the application servers is stored as data records 110. The data records 110 may be collected for the applications 104 executed by one or more of the user devices 102.

In order to improve upon conventional classification methods, additional information about the data (the traffic flow) may be required. In conventional systems, often the traffic flow is defined as a "5-tuple" flow, whereby the number "5" refers to a set of five (5) different values of a Transmission Control Protocol/Internet Protocol (TCP/IP) connection. The values are: source IP address, source IP port number, destination IP address, destination IP port number, and the protocol used. The source address is the IP address of the network that creates and sends a data packet, and the destination address is the recipient. For example, if the application 104A is a social media application and a user of the user device 102A requests a video to be provided by the application server 106A, the application server 106A may be the source IP address and the user device 102A may be the destination IP address.

The requested video will be received and provided to the user device 102A according to policies agreed upon between the network 108 and the application server 106A. The network 108 can extract the source IP address and determine that a policy applies to the transmission. However, as noted above, it is becoming increasingly common for services, such as those provided by the application server 106A, to obfuscate (encrypt) its source IP address. Therefore, in some examples, the network 108 may be unaware that a policy exists, and thus, transmit the requested video using more network 108 resources than otherwise agreed to. In this example, additional information may be needed to classify the network traffic appropriately.

In this regard, the data records 110 determine and store additional information about the traffic flow. Illustrated in FIG. 1 are the following information: active time 112, active bytes 114, active sessions 116, and large uplink count 118. The information is information relating to the traffic flow. It should be noted that, in some examples, more information or less information may be used. However, the use of more information, such as those illustrated in FIG. 1, can help increase the accuracy of the traffic classification. The active time 112 is a measure of the length of the traffic flow from the first to last packet (or other unit of measurement). The active bytes 114 are a measure of the bytes of data associated with a flow. The active sessions 116 are the number of sessions currently being transmitted in a flow. The large uplink count 118 is a count of uplink packets in a traffic flow, typically from the application servers 106, that are above a certain data size threshold.

Figure 2:
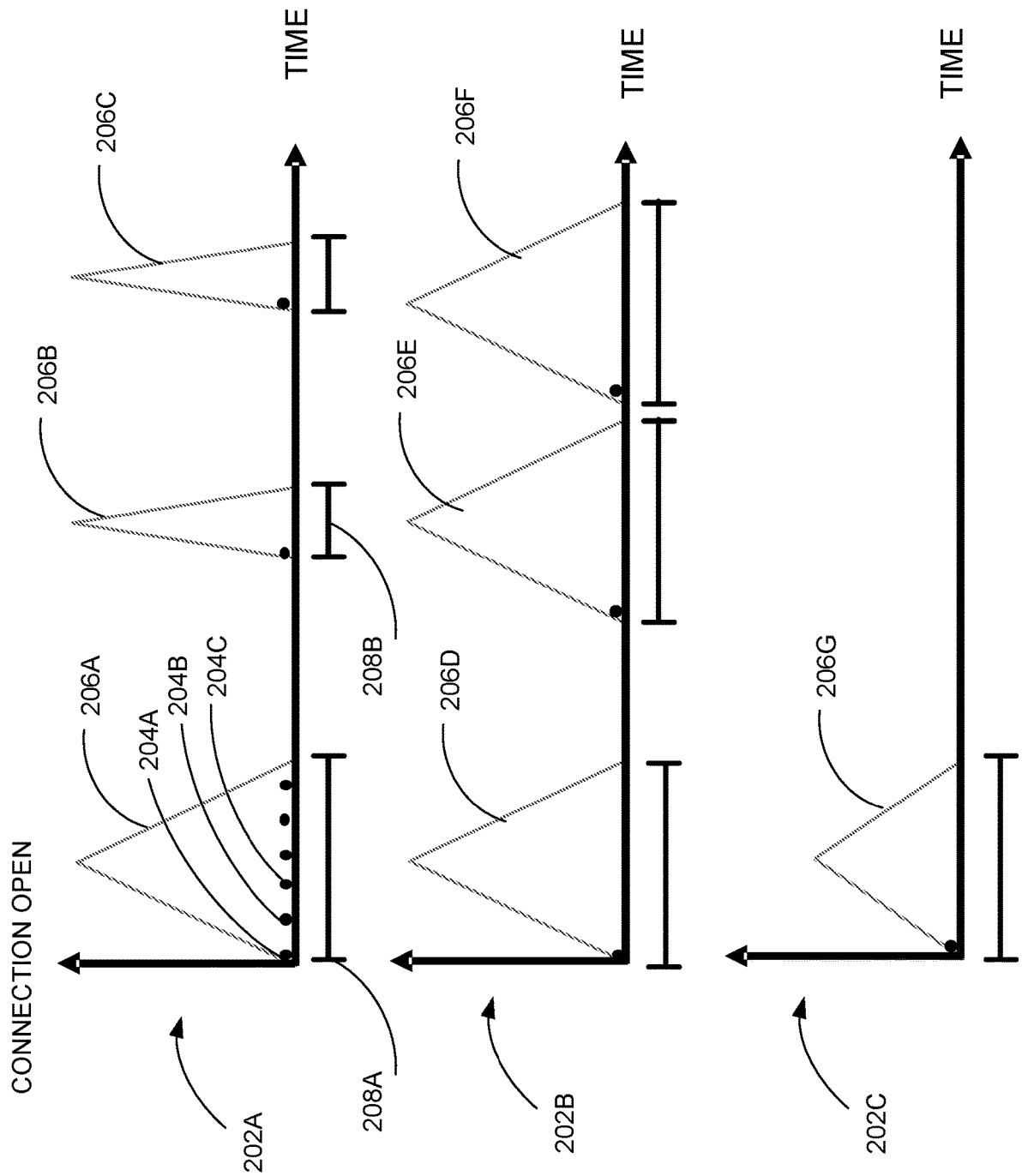
FIG. 2 is a graphical illustration of some aspects of traffic flows that may be used to classify the traffic flows, in accordance with some examples of the present disclosure.

For graphical illustration of some aspects of traffic flows that may be used as information to classify the traffic flows, FIG. 2 is provided. FIG. 2 is an illustration showing different types of flows to illustrate the various information listed above. Illustrated in FIG. 2 are flows 202A, 202B, and 202C (hereinafter referred to generically as "traffic flows 202," and individually as "traffic flow 202A," "traffic flow 202B," and "traffic flow 202C"). The horizontal axis for the traffic flows 202 are time and the vertical axis for the traffic flows 202 is commenced (indicating a peak) or waiting (no peak). The traffic flow 202A may be representative of a video streaming service. In the traffic flow 202A, data portions 204A-C are indicated by a "dot" in the respective flow portion 206A.

In some examples, the data portions 204A-C, as well as those not identified but are illustrated as a dot in their respective flow portion, may be a relatively large uplink packet. For example, a video streaming service may be uploading or streaming video, which may be relatively larger data chunks than text or pictures. In flow portions 206B and 206C, one large uplink packet is illustrated for each flow portion 206B and 206C, respectively. As used herein, the flow portions 206, either together or individually, are used to define a flow and its classification. For example, the flow 202B has three flow portions 206D-F, like the flow 202A, whereas the flow 202C has a single flow portion, 206G used to define the flow 202C. The traffic flows 202 may be classified based on all the flow portions 206 associated with their respective traffic flows 202 or one or more of the flow portions 206, e.g. a subset of the flow portions, associated with the traffic flows 202. A match against a training set of data can involve matching all the flow portions of the traffic flow to the training set of data or matching a subset of the flow portions of the traffic flow to the training set of data. While matching all the flow portions may increase the accuracy of the matching process, the matching process may be relatively long and slow down traffic flows, whereas matching a subset of the flow portions may be less accurate, the time required to find a match may be reduced, thereby increasing the speed of finding an appropriate policy. In some examples, matching would occur based on one or more characteristics of flow and packets. For example, a video flow may have a few large upload (UL) packets then a large chunk of download (DL) packets, followed by a single (or multiple) large UL packets and then another large DL packets. The timing between the requests would be similar for all similar flows.

Also illustrated in FIG. 2 are active times 208A and 208B. As illustrated, the active time 208A is the time in which the flow portion 206A is active. The active time 208B is the time in which the flow portion 206B is active. The active times, such as the active times 208A and 208B, may be used to further identify and classify a traffic flow. For example, both the flows 202A and 202B have three flow portions. If an attempt is made to classify the flows 202A and 202B only using the number of flow portions, flows 202A and 202B may be determined to be from the same source and of the same type. Rather, as illustrated, the flow 202A has one flow portion with a relatively longer active time and two flow portions with relatively shorter active times, whereas, the flow 202B has three flow portions with the same, relatively longer active time. Further, the flow 202C has one flow portion with one relatively longer active time. These aspects of the flows 202, including the number of large uplink packets may be used to classify the flow.

Returning to FIG. 1, the cellular network 108 further includes a training set of data 120. The training set of data 120 are data that is collected from multiple traffic flows and are used to identify new traffic flows against previously identified traffic flows. For example, referring back to FIG. 2, the traffic flow 202A may have been identified as a pattern of traffic flow coming from a specific social media website. Thus, even if in the future the social media website starts encrypting their traffic flow, including the source IP address, the training set of data 120 may be used to compare the new, encrypted traffic flow against. To perform the comparison, a classification engine 122 is provided. The classification engine 122 receives traffic flows from the application servers 106 or the user devices 102. The classification engine 122 determines information about the incoming traffic flow, such as the active time 112, the active bytes 114, the active sessions 116, and the large uplink counts 118 to determine a flow pattern. The flow pattern is compared against the flow patterns in the training set of data 120. If a match is made, the incoming traffic flow is classified according to the identified flow pattern of the training set of data 120.

In some examples, if information about the flow pattern may not be classifiable concurrently, information about the incoming traffic flow may be prioritized for analysis based on various factors, such as an expected load on the cellular network 108. For example, because of the amount of potential bandwidth to be used, the classification engine 122 may attempt to first categorize traffic flow based on active bytes 114 or large upload link count 118. In that manner, the traffic flow may be classified more rapidly, allowing for the identification and application of policies associated with the traffic flow to occur.

Figure 3:
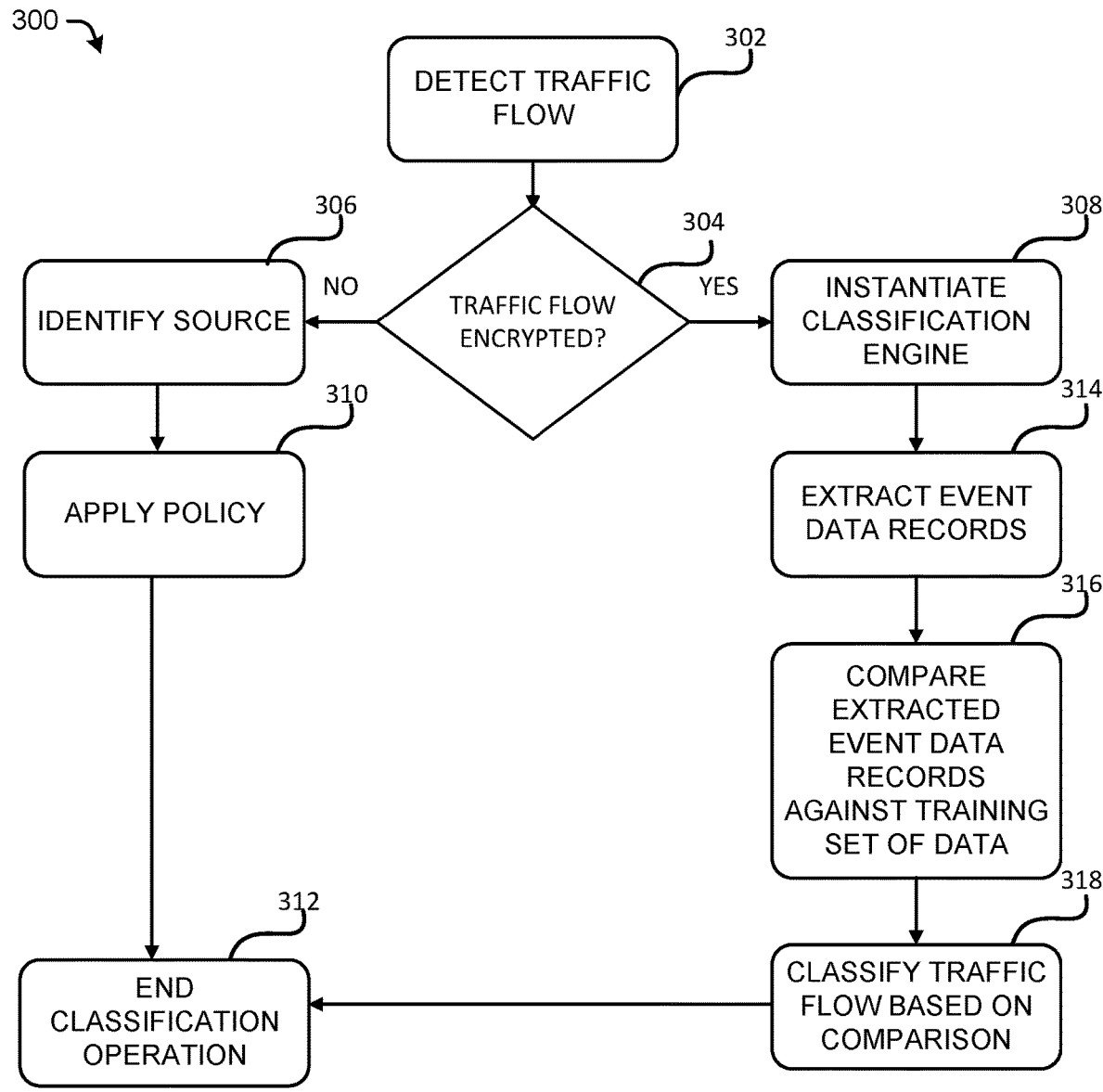
FIG. 3 is an illustrative process for classifying a traffic flow, in accordance with some examples of the present disclosure.

FIG. 3 is an illustrative process 300 for classifying a traffic flow. The process 300 and other processes described herein are illustrated as example flow graphs, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted and/or combined in any order and/or in parallel to implement the processes.

The process 300 commences at operation 302, where a traffic flow, such as the traffic flow 202A, 202B, or 202C of FIG. 2, is detected.

The process 300 continues to operation 304, where a determination is made as to whether or not the traffic flow 202 is encrypted or unencrypted. If the traffic flow 202 is unencrypted, the process 300 continues to operation 304. If the traffic flow 202 is encrypted, the process 300 continues to operation 308.

At operation 306, based on a determination at operation 304 that the traffic flow 202 is unencrypted, the source of the traffic flow is identified. As noted herein, a source may be one of the application servers 106 or one of the applications 104 executing on the user devices 102. The source of the traffic flow helps identify if there is a particular policy to apply to the traffic flow 202. There may be various ways in which a source may be identified when the traffic flow 202 is not encrypted. For example, the traffic flow 202 may be analyzed to extract a Uniform Resource Locator ("URL") associated with the traffic flow 202. The URL may be used to identify the source so that a policy may be enforced at operation 310, and thereafter, the classification operation ends at operation 312.

At operation 308, based on a determination at operation 304 that the traffic flow 202 is encrypted, the classification engine 122 is instantiated. As noted above, the classification engine 122 receives traffic flows 202 from the application servers 106 or the applications 104 executing on the user devices.

The process 300 continues to operation 314, where the data records 110 are extracted from the traffic flows 202. The classification engine 122 determines information about the incoming traffic flow, such as the active time 112, the active bytes 114, the active sessions 116, and the large uplink counts 118 to determine a flow pattern.

The process 300 continues to operation 316, where extracted data records 110 are compared to the flow patterns in the training set of data 120. The training set of data 120 may be compiled using historical records of known sources (i.e. before encryption was used by those sources) or general categories of sources. For example, social media websites tend to offer the same services and resources, and therefore, tend to have similar, if not the same, traffic flow patterns.

The process 300 continues to operation 318, where the traffic flow is classified based on the comparison. If a match is made, the incoming traffic flow 202 may be serviced according to a policy. If the traffic flow 202 is not classifiable (i.e. no match was made), the traffic flow 202 may be serviced based on a default policy. In some examples, a "match" is made when a predefined comparative threshold is met between the traffic flow and the training set of data 120. For example, if the active time of the traffic flow 202 and the training set of data 120 are within a predetermined period of time of each other, e.g. 10 ms, then a match may be made. Because the match is made for only one data, the confidence level may be low. However, for example, if the traffic flow 202 is within 10% of active bytes, active time, and large uplink counts, the traffic flow 202 may be matched to the training set of data 120 at a high confidence level. The more data matches, the higher a confidence level may be achieved. In this manner, even though a match may be made, the process 300 may still not classify the traffic flow 202 based on the match if the confidence level is low.

A default policy may be a policy that instructs the network 108 to service the traffic flow 202 based on the types of data associated with the traffic flow 202. For example, traffic flow 202 that is primarily text or other low bandwidth data, the default policy may be to process the traffic flow 202 at a lower priority. In another example, if the traffic flow 202 includes a large amount of data (such as streaming video), to maintain viewing quality, the network 108 may apply a default policy that prioritizes the traffic flow 202, as video quality may be of greater concern of subscribers than the speed at which text is delivered.

Figure 4:
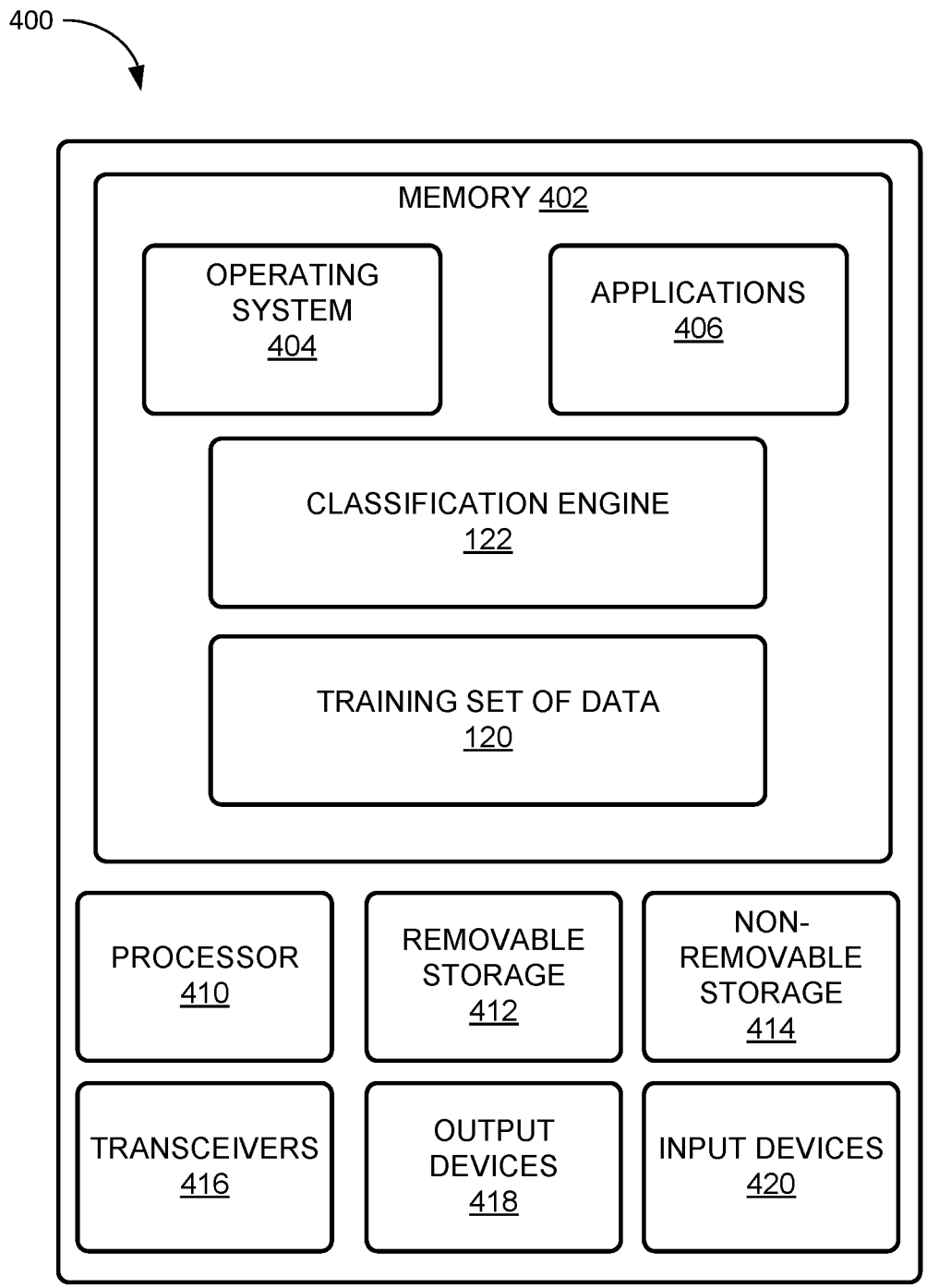
FIG. 4 depicts a component level view of a server computer for use with the systems and methods described herein, in accordance with some examples of the present disclosure.

FIG. 4 depicts a component level view of a server computer 400 for use with the systems and methods described herein. The server computer 400 could be any device capable of providing the functionality associated with the systems and methods described herein. The server computer 400 can comprise several components to execute the above-mentioned functions. The server computer 400 may be comprised of hardware, software, or various combinations thereof. As discussed below, the server computer 400 can comprise memory 402 including an operating system (OS) 404 and one or more standard applications 406. The standard applications 406 may include applications that provide for communication with the cellular network 108, one or more of the application servers 106, and one or more of the user devices 102.

The server computer 400 can also comprise the classification engine 122 and the training set of data 120. The memory 402 may also include data records 110, active time 112, active bytes 114, active sessions 116, and large uplink count 118 for one or more traffic flows 202.

The server computer 400 can also comprise one or more processors 410 and one or more of removable storage 412, non-removable storage 414, transceiver(s) 416, output device(s) 418, and input device(s) 420. In various implementations, the memory 402 can be volatile (such as random access memory (RAM)), non-volatile (such as read only memory (ROM), flash memory, etc.), or some combination of the two.

The memory 402 can also include the OS 404. The OS 404 varies depending on the manufacturer of the server computer 400. The OS 404 contains the modules and software that support basic functions of the server computer 400, such as scheduling tasks, executing applications, and controlling peripherals. In some examples, the OS 404 can enable the classification engine 122 and the training set of data 120, and provide other functions, as described above, via the transceiver(s) 416. The OS 404 can also enable the server computer 400 to send and retrieve other data and perform other functions.

The server computer 400 can also comprise one or more processors 410. In some implementations, the processor(s) 410 can be one or more central processing units (CPUs), graphics processing units (GPUs), both CPU and GPU, or any other combinations and numbers of processing units. The server computer 400 may also include additional data storage devices (removable and/or non-removable) such as, for example, magnetic disks, optical disks, or tape. Such additional storage is illustrated in FIG. 4 by removable storage 412 and non-removable storage 414.

Non-transitory computer-readable media may include volatile and nonvolatile, removable and non-removable tangible, physical media implemented in technology for storage of information, such as computer readable instructions, data structures, program modules, or other data. The memory 402, removable storage 412, and non-removable storage 414 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the server computer 400. Any such non-transitory computer-readable media may be part of the server computer 400 or may be a separate database, databank, remote server, or cloud-based server.

In some implementations, the transceiver(s) 416 include any transceivers known in the art. In some examples, the transceiver(s) 416 can include wireless modem(s) to facilitate wireless connectivity with other components (e.g., between the server computer 400 and a wireless modem that is a gateway to the Internet), the Internet, and/or an intranet. Specifically, the transceiver(s) 416 can include one or more transceivers that can enable the server computer 400 to send and receive data using the cellular network 108. Thus, the transceiver(s) 416 can include multiple single-channel transceivers or a multi-frequency, multi-channel transceiver to enable the server computer 400 to send and receive video calls, audio calls, messaging, etc. The transceiver(s) 416 can enable the server computer 400 to connect to multiple networks including, but not limited to 2G, 3G, 4G, 5G, and Wi-Fi networks. The transceiver(s) can also include one or more transceivers to enable the server computer 400 to connect to future (e.g., 6G) networks, Internet-of-Things (IoT), machine-to machine (M2M), and other current and future networks.

The transceiver(s) 416 may also include one or more radio transceivers that perform the function of transmitting and receiving radio frequency communications via an antenna (e.g., Wi-Fi or Bluetooth®). In other examples, the transceiver(s) 416 may include wired communication components, such as a wired modem or Ethernet port, for communicating via one or more wired networks. The transceiver(s) 416 can enable the server computer 400 to facilitate audio and video calls, download files, access web applications, and provide other communications associated with the systems and methods, described above.

In some implementations, the output device(s) 418 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 418 can also include speakers, or similar devices, to play sounds or ringtones when an audio call or video call is received. Output device(s) 418 can also include ports for one or more peripheral devices, such as headphones, peripheral speakers, or a peripheral display.

In various implementations, input device(s) 420 include any input devices known in the art. For example, the input device(s) 420 may include a camera, a microphone, or a keyboard/keypad. The input device(s) 420 can include a touch-sensitive display or a keyboard to enable users to enter data and make requests and receive responses via web applications (e.g., in a web browser), make audio and video calls, and use the standard applications 406, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 420 and an output device 418.

The presently disclosed examples are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method, comprising:
   detecting a first traffic flow on a network;
   determining that the first traffic flow is encrypted;
   upon a determination that the first traffic flow is encrypted, instantiate a classification engine to commence a process of:
      extracting data records of the first traffic flow, wherein the data records comprise active time, active bytes, active sessions, and a count of large uplinks, and wherein the active time is a measure of a time length of the first traffic flow from a first packet of the first traffic flow to a last packet of the first traffic flow, the active sessions are a number of sessions currently being transmitted in the first traffic flow, and the count of large uplinks is a count of uplink packets in the first traffic flow that are above a data size threshold;
comparing the data records of the first traffic flow against a training set of data;
determining a match between the training set of data and the first traffic flow; and
classifying the first traffic flow based on the match; and applying a policy based on the match.

2. The method of claim 1, further comprising:
determining that a second traffic flow is unencrypted;
identifying a source of the second traffic flow; and
applying a second policy associated with the source.

3. The method of claim 1, further comprising determining, by the classification engine, a prioritization of the data records.

4. The method of claim 3, wherein the prioritization of the data records is based on an expected load of the first traffic flow on the network.

5. The method of claim 3, wherein the prioritization of the data records is based on the active bytes of the first traffic flow or a large upload link identified in the first traffic flow.

6. The method of claim 1, wherein a source of the first traffic flow comprises an application or an application server.

7. The method of claim 1, wherein finding the match comprises matching all flow portions of the first traffic flow to the training set of data or matching a subset of the flow portions of the first traffic flow to the training set of data.

8. A non-transitory computer-readable storage medium having computer-executable instructions stored thereupon that, when executed by a computer, cause the computer to perform acts comprising:
determining a first traffic flow is encrypted;
upon a determination that the first traffic flow is encrypted, instantiate a classification engine to commence a process of:
extracting data records of the first traffic flow, wherein the data records comprise active time, active bytes, active sessions, and a count of large uplinks, and wherein the active time is a measure of a time length of the first traffic flow from a first packet of the first traffic flow to a last packet of the first traffic flow, the active sessions are a number of sessions currently being transmitted in the first traffic flow, and the count of large uplinks is a count of uplink packets in the first traffic flow that are above a data size threshold;
comparing the data records of the first traffic flow against a training set of data;
determining a match between the training set of data and the first traffic flow; and
classifying the first traffic flow based on the match; and applying a policy based on the match.

9. The non-transitory computer-readable storage medium of claim 8, further comprising instructions for:
determining that a second traffic flow is unencrypted;
identifying a source of the second traffic flow; and
applying a second policy associated with the source.

10. The non-transitory computer-readable storage medium of claim 8, further comprising instructions for determining a prioritization of the data records.

11. The non-transitory computer-readable storage medium of claim 10, wherein the prioritization of the data records is based on an expected load of the first traffic flow on a network.

12. The non-transitory computer-readable storage medium of claim 10, wherein the prioritization of an event data is based on active bytes of the first traffic flow or a large upload link identified in the first traffic flow.

13. The non-transitory computer-readable storage medium of claim 8, wherein a source of the first traffic flow comprises an application or an application server.

14. The non-transitory computer-readable storage medium of claim 8, wherein the computer-executable instructions for finding the match comprises computer-executable instructions for matching all flow portions of the first traffic flow to the training set of data and computer-executable instructions matching a subset of the flow portions of the first traffic flow to the training set of data.

15. A system comprising:
a memory storing computer-executable instructions; and
a processor in communication with the memory, the computer-executable instructions causing the processor to perform acts comprising:
detecting a traffic flow on a network;
determining that the traffic flow is encrypted;
instantiating a classification engine to commence a process of:
extracting data records of the traffic flow, wherein the data records comprise active time, active bytes, active sessions, and a count of large uplinks, and wherein the active time is a measure of a time length of the traffic flow from a first packet of the traffic flow to a last packet of the traffic flow, the active sessions are a number of sessions currently being transmitted in the traffic flow and the count of large uplinks is a count of uplink packets in the traffic flow that are above a data size threshold;
comparing the data records of the traffic flow against a training set of data; and
applying a policy based on a match to the training set of data or a default policy if no match is found.

16. The system of claim 15, wherein the computer-executable instructions for comparing the classification engine further comprises computer-executable instructions for prioritizing the data records for comparison, wherein the prioritization of an event data is based on an expected load of the traffic flow on the network, on active bytes of the traffic flow, or a large uplink count identified in the traffic flow.

17. The system of claim 15, wherein the computer-executable instructions for finding the match comprises computer-executable instructions for matching all flow portions of the traffic flow to the training set of data and computer-executable instructions matching a subset of the flow portions of the traffic flow to the training set of data.

* * * * *